United States Patent [19]

Sick

[11] 4,127,771
[45] Nov. 28, 1978

[54] OPTICAL APPARATUS

[75] Inventor: Erwin Sick, Icking, Fed. Rep. of Germany

[73] Assignee: Erwin Sick Gesellschaft mit beschrankter Haftung Optik-Elektronik, Waldkirch, Fed. Rep. of Germany

[21] Appl. No.: 701,073

[22] Filed: Jun. 30, 1976

[30] Foreign Application Priority Data

Jul. 21, 1975 [DE] Fed. Rep. of Germany ....... 2532602

[51] Int. Cl.² .............................................. G01D 21/04
[52] U.S. Cl. ..................................... 250/221; 350/6.6; 350/299
[58] Field of Search ....................... 356/158, 160, 167; 350/6, 7, 96 R, 285, 286, 288, 292, 299; 250/221

[56] References Cited

U.S. PATENT DOCUMENTS

| 2,946,253 | 7/1960 | Clark | 350/96 R |
| 2,971,695 | 2/1961 | Sick | 350/285 |
| 3,464,133 | 9/1969 | DePoray | 350/96 R |
| 3,514,183 | 5/1970 | Rabedeau | 350/285 |
| 3,877,802 | 4/1975 | Greenspan | 350/299 |
| 4,052,120 | 10/1977 | Sick | 350/6 |

Primary Examiner—M. Tokar

[57] ABSTRACT

Optical apparatus for extending a light curtain, using a light beam shifted periodically laterally parallel to itself onto an array of plane mirrors at an angle to the beam, the span of the array normal to the emergent reflected beam being greater than its span normal to the incident beam.

21 Claims, 6 Drawing Figures

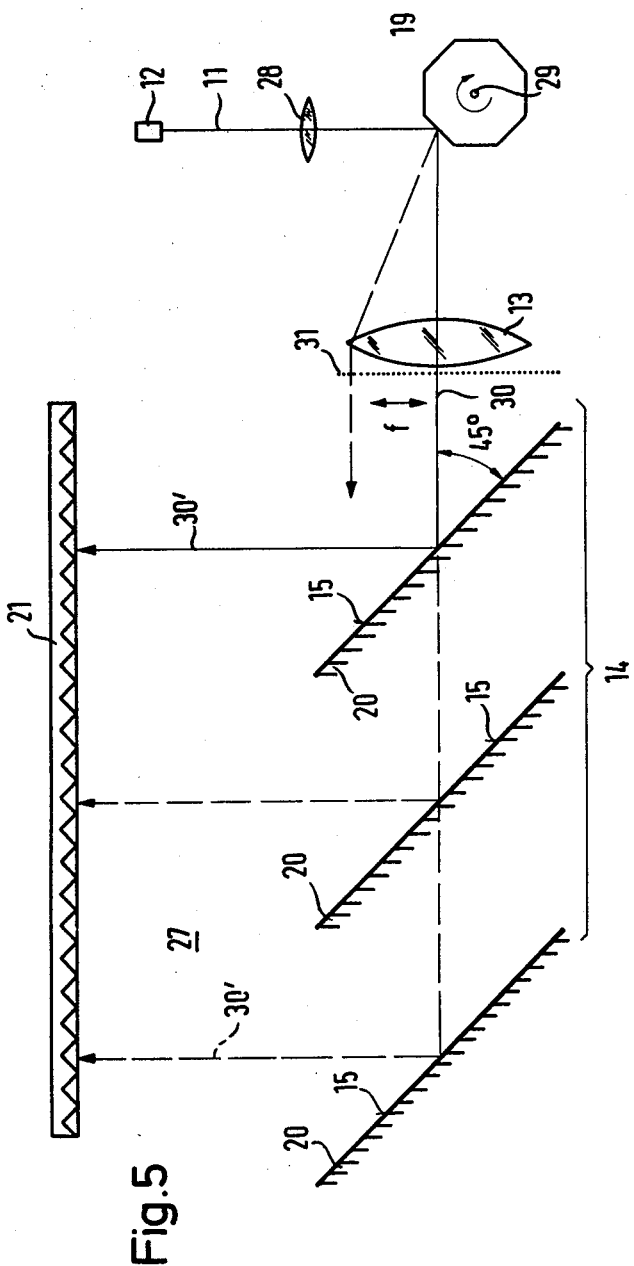
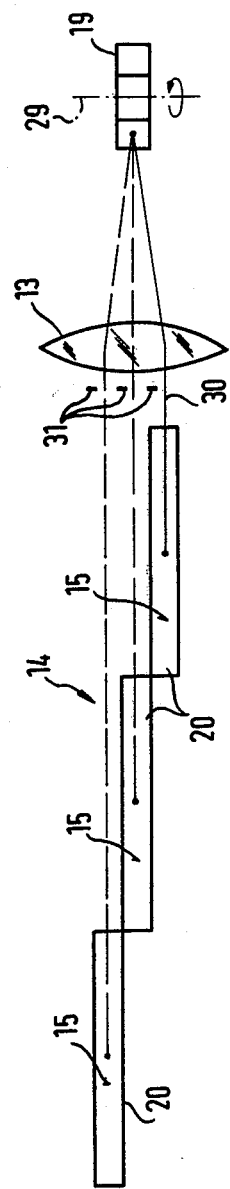
Fig.5
Fig.6

OPTICAL APPARATUS

The invention relates to an optical apparatus for extending a light curtain using a light source which emits a light beam and a deflection device which periodically deflects the light beam parallel to itself.

In a known apparatus for producing a light curtain (U.S. Pat. No. 3,360,654), a light beam, produced by a light source, is periodically moved back and forth, parallel to itself and by means of a mirror wheel arranged at the focal point of a concave mirror, over the curtain area to be scanned. At the end of the curtain area is a reflector, which preferably consists of retroreflecting material and reflects the light beam back on to itself, and, by way of the concave mirror, the mirror wheel and also a semi-transparent mirror, deflects the light ray on to a photoreceiver. We are concerned there with an autocollimation arrangement; when an obstruction is present in the light path, the signal appearing at the output of the photoreceiver is altered. This signal alteration can be utilised for indicating the presence of an obstruction in the path of the light radiation.

It is also known to form a light curtain by a plurality of light sources, for example GaAs-diodes, which lie one beside the other and by lenses arranged behind the diodes, the light sources being switched on periodically in succession, so as to obtain a travelling beam which is advanced in discontinuous steps. A retroreflector or a light guiding bar can also be arranged on the side opposite the light sources, photoreceivers being fixed on the end faces of the light guiding bar or rod. In the case of these light curtains also, a suitable electronic evaluating means may enable the location of an obstruction, which has penetrated the light curtain, to be detected.

Light curtains of this kind can be used both for accident protection, for example with presses, in which case the demands placed on the optical elements used are not too severe, and also for the exact measurement of the location or extent of an object which has passed into the light curtain, in which case the demands placed on the optical elements used, are appreciably more exacting.

The provision of a concave mirror, extending the whole width of the scanned area, and also the use of very many light sources, both constitute expensive measures, which appreciably increase the costs of such equipment even when the quality of the optical elements used is not high, as when the light curtains are used for affording protection against accidents.

The invention is based on an appreciation of the fact that no problem is entailed in producing a light curtain of limited width, particularly by means of a laser light source, for example a rocking mirror or a mirror wheel being placed in the focal point of a lens or objective, the laser beam acting on the rocking mirror or mirror wheel. The reflected beam is then periodically directed, by the scanning assembly, over the lens surface, so that a scanning light beam, shifted parallel to itself, emerges from the lens. However, the width of a light curtain of this kind is restricted by reason of the relatively small diameter of the lens or objective.

Underlying this invention is the object of providing an optical apparatus for extending a light curtain of this kind, which can be produced inexpensively and is constituted, according to requirements merely as a light curtain which carries out coarse measurements for providing protection against accidents, or as a light curtain which affords accurate measurements.

According to the invention this object is achieved by arranging for the light beam, which is shifted parallel to itself, to be directed on to an array of plane mirrors, the span of the array perpendicular to the direction of the emergent beam being greater than the span of the array perpendicular to the direction of the incident beam. Thus, the basic concept of the invention resides in the fact that, through a suitably constituted assembly or array of plane mirrors, the light curtain behind the lens — this curtain being initially small — is extended in the scanning direction, so that it is given dimensions normal in the case of the known relatively expensive equipments, although only one light source is needed and there is no requirement for excessively large optical focussing elements such as lenses or concave mirrors.

Conveniently, the array of plane mirrors consists of mirrors which lie in echelon or graded formation and make the same angle with the direction of incident radiation. By virtue of the echelon or graded formation, which may be provided both in the direction of the incident beams and also in a direction transversely of the incident beams, the desired extension of the light curtain in the scanning direction is achieved.

Conveniently, the plane mirrors make an angle of 45° with the direction of the incident beams, so that the light beams of the narrow light curtain, which impinge on the array of plane mirrors at 45°, are reflected at an angle of 90°.

According to a first embodiment of the invention the plane mirrors are disposed in the form of a strip and are spaced from one another, the spacing between the plane mirrors preferably being constant. It may be found advantageous if the intermediate elements between adjacent plane mirrors extend substantially parallel to the direction of the incident rays. In this way there is obtained a stepped formation, the step-like intermediate elements between the plane mirrors, arranged at 45°, serving to extend the array of plane mirrors and thus the width of the light curtain. By directing the intermediate element substantially parallel to the direction of incident radiation, full utilisation of the mirror surfaces is realised, with a minimum of dead zones. The width of the intermediate elements corresponds to the dead zones present between adjacent mirrors and within which no scanning takes place. Thus, the dead zones between the plane mirrors must be suitably dimensioned according to the particular practical application in question by giving the light curtain the appropriate resolution, so that the curtain will reliably detect the presence of even the smallest objects in the scanning region. Accordingly, a light curtain functioning with a stepped mirror will be particularly appropriate for applications such as protection against accidents.

A particularly simple embodiment is characterised in that there is provided a single strip which bears mutually spaced plane mirrors, this strip preferably making an angle smaller than 45° with the direction of the incident beams. Conveniently, the tangent of the angle of the strip to the direction of the incident beams is between ⅓ and ⅛, preferably 1/5. In this case an appreciable extension of the light curtain, by a factor of 3 to 8, is ensured, while the widths of the dead zones between the scanning fields still lie within acceptable limits.

The width of the dead zones can be reduced, without at the same time decreasing the factor by which the light curtain is extended, by arranging a plurality of strips so that they are laterally offset relative to one another, and follow one another in the direction of the incident beams (possibly with a slight overlap), and by periodically shifting the beam not only in the reflection plane but also perpendicular to this plane, with the result that the beam is successively incident on the separate, mutually laterally offset strips. Thus, the individual strips can be arranged at the optimal angles below 45° (for example, $\tan^{-1} 1/5$); by the provision of a sufficiently large number of such mutually laterally offset strips, arranged one following the other, the desired extension of the light curtain is accomplished. Naturally, it will, generally speaking, suffice if two laterally offset strips are provided, each of which lies at $\tan^{-1} 1/5$ to the direction of the incident rays.

The lateral shift of the scanning light beam can be simply effected by, for example, tilting to different extents the successive surfaces of a mirror wheel relative to the mirror wheel axis, so that the light beams, reflected at the individual surfaces of the mirror wheel, at the same time undergo differing degrees of lateral deflection. Thus, one or more reflective surfaces of the mirror wheel are associated with each strip, covered with plane mirrors. However, the lateral shift may also be effected by means of a rocking mirror by arranging for this rocking mirror to be pivotable not only about its axis of rocking motion, but also about the light beam which is incident upon it.

In the case of another embodiment of the invention, which is particularly suitable for light curtains capable of measuring, the plane mirrors are constituted as a continuous plane on the surface of a strip; conveniently, these two strips are laterally offset, with respect to one another, and directly follow one another in the direction of the incident rays, although there may be a slight overlap between them. The deflection device periodically shifts the beam not only in the reflection plane, but also perpendicular to the latter, with the result that the beam is successively incident on the different mutually laterally offset strips. The lateral shift can also be achieved, in the abovementioned form, by means of mirror surfaces of a mirror wheel, which are tilted differently from one another, or by means of a rocking lever which is pivotable about another axis.

The embodiment with plane mirrors which are laterally offset although they are, in themselves, continuous, provides a light curtain which is completely uninterrupted in the scanning direction. Accordingly, the dead zones between the two stepped mirrors are not present in this embodiment. This is the reason why a light curtain of this type is particularly suited for measuring the locations and extent of objects.

While it is possible to provide, at the end of the light curtain lying opposite the array of plane mirrors, any desired receiving arrangement, for example a light guiding bar (rod), which is equipped with photoreceivers at the end faces, it is preferable to arrange a retroreflector at the other end of the light curtain, this retroreflector reflecting the scanning light beams, incident upon it, back onto themselves. Through a provision of this kind, the invention provides for an array of plane receiving mirrors parallel to the array of plane transmitting mirrors, the output beam of which array of receiving mirrors is fed to a photoreceiver. Conveniently, the array of plane receiving mirrors is optically identical to the array of plane transmitting mirrors. Naturally, it may be found advantageous to arrange for the array of plane receiving mirrors to be wider (preferably twice the width) than the array of plane transmitting mirrors, thereby making an allowance for the light lost when passing through the light curtain and, in particular, for the reflection from the retroreflector.

In a particularly simple embodiment, the array of plane receiving mirrors and the array of plane transmitting mirrors are arranged on one and the same strip. Of course, an optical separating wall, extending parallel to the reflection plane, should lie between the array of plane receiving mirrors and the array of plane transmitting mirrors, this wall being intended to prevent any direct coupling between the transmitted light radiation and the received light radiation.

The output beam of the array of plane receiving mirrors is preferably guided to the photoreceiver by optical deflecting means.

Conveniently, the deflection device may consist of one or more oscillating or rotating mirrors which, in their position in which they reflect the light beam, lie at the focal point of a lens. Preferably, an optical deflecting means is arranged in the output beam of the array of plane receiving mirrors, and guides the output beam to the photoreceiver. The optical deflection means may for example be a wedge arranged in front of or behind the lens. However, use may also be made of split lenses with mutually shifted optical axes, specially ground lenses, or the like.

In other words the light beam, reflected on the retroreflector and on the array of plane mirrors provided according to the invention, is received by the same optical means through which the transmission light beam is cast on to the array of plane transmitting mirrors. Thus, we are concerned here with an autocollimation radiation path, with pupil division. However, so as to ensure that the output (emergent) light beam will not return to the starting point on the oscillating or rotating mirror — which would necessitate the provision of a beam-splitting mirror — the output or emergent light beam is directed, by the optical deflection means located in one half pupil, onto the photoreceiver, which may, conveniently, lie beside the mirror.

Embodiments of the invention are described below by way of illustration but without limiting the scope of the invention, with reference to the drawing, in which:

FIG. 5 is a schematic side elevation of another apparatus for producing a light curtain, particularly intended for measurement purposes; and FIG. 6 is a plan view of the essential elements of the apparatus shown in FIG. 5.

Figure 1:
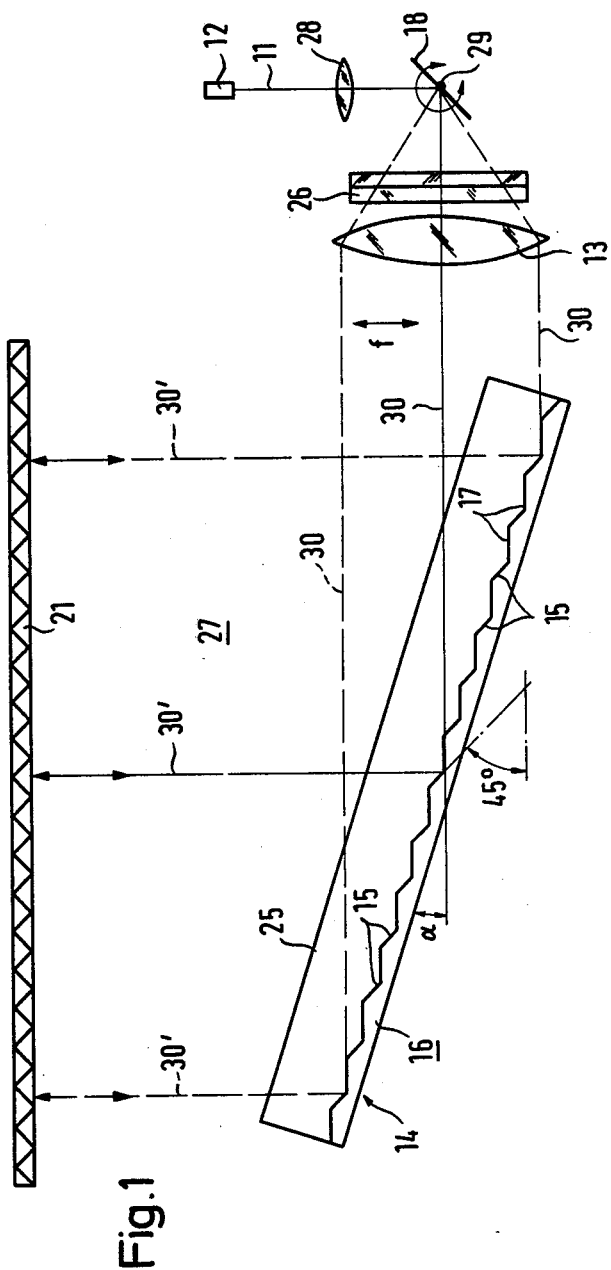
FIG. 1 is a schematic side elevation of an apparatus according to the invention for producing a light curtain.

As shown in FIG. 1, a light beam 11 from a laser 12 strikes, at an angle of about 45°, a pivoted mirror 18, capable of rocking back and forth about a swivel pin 29 extending perpendicular to the plane of the drawing. The rocker mirror 18 is arranged at the focal point of a lens 13 which, together with lens 28, forms a reverse telescope system, which produces a spread of the laser beam, and, consequently, a corresponding decrease of the image angle of the laser beam. In this way there is formed, behind the lens 13, a very narrow and substantially parallel light beam.

The pivotal range of the rockable mirror is sufficiently large that the light beam, after being reflected, can be fed back and forth over substantially the whole surface of the lens 13. This range is depicted in FIG. 1 by dashed boundary lines.

Owing to the fact that the rocking mirror 18 lies at the focal point of the lens 13, the light beams reflected by the rocking mirror 18 leave the lens 13 parallel to the optical axis. When the mirror 13 is caused to rock back and forth, there is formed, behind the lens 13, a travelling beam 30, which is periodically shifted parallel to itself in the direction of arrow $f$.

Figure 2:
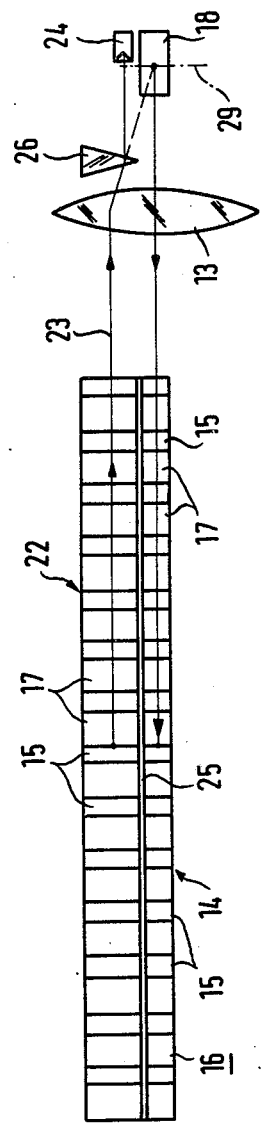
FIG. 2 is a schematic plan view of the essential elements of the apparatus shown in FIG. 1.

According to the invention, and in the manner illustrated in FIGS. 1 and 2, a strip 16 is arranged behind the lens 13, and lies at an angle $\alpha$ relative to the optical axis. The strip 16 is constituted by an array 14 of plane mirrors, which consists of plane mirrors 15, lying at an angle of 45° to the optical axis, and intermediate pieces 17 located between adjacent mirrors 15. Although the intermediate elements 17 do not have to be reflective, they may nevertheless be reflective, as are the plane mirrors 15, if this is found to be advantageous for reasons of manufacture. While the plane mirrors 15 lie at an angle of 45° to the optical axis, intermediate elements 17 extend substantially parallel to the optical axis, so that the travelling beams for incident light beams 30 are grazingly incident on these elements 17. If such grazing incidence is not desired, the intermediate elements 17 may be arranged to slope downwards from the direction of the incident beams, so that the latter cannot reach the intermediate elements 17. The plane mirrors 15 and the intermediate elements 17 are of the same length as one another.

Lying opposite the array 14 of plane mirrors, and extending parallel to the optical axis, is a retroreflector 21, so that the light curtain 27 extends between this retroreflector 21 and the array 14 of plane mirrors.

In the course of reciprocating movement of the rocking lever 18, the travelling beam 30 passes through the whole heightwise extent of the lens 13. The travelling beam 30 strikes, successively and in stepwise manner, against the succession of plane mirrors 15, arranged one in front of the other, the travelling beam 30 being deflected by these mirrors and through 90°, to the retroreflector 21. Thus, the travelling beam 30' travels transversely through the light curtain 27 in a series of "jumps". The scanning movement is continuous within the limits of the plane mirrors 15. When the travelling beam has reached the end of a plane mirror 15, it jumps over the intermediate elements 17 to the next-following plane mirror 15. Thus, the light curtain exhibits interruptions or dead zones along the intermediate elements 17, although these interruptions may be made sufficiently narrow according to the density required of the light curtain. The closer the angle of $\alpha$ approaches 45°, the narrower will be the dead zones; naturally, the span of the narrow light curtain, present at the outlet of lens 13, will be correspondingly reduced.

FIG. 2 illustrates particularly clearly a receiving arrangement, based on the same principle, for the beams reflected by the retroreflector 21. Positioned beside the strip 16 is an identical array 22 of plane receiving mirrors, except that this array 22 has twice the width of the strip 16; it may even form a single unit with the array 14 of plane light-transmitting mirrors. A separating wall 25 lies between the arrays 14 and 22 of plane light-transmitting and plane light-receiving mirrors, and is located in the reflection plane. By the provision of this separating wall 25 it is ensured that light will not bypass the light curtain 27, that is to say will not pass directly into the light-receiving section and thus lead to disturbances in operation.

By virtue of the provision of the arrangement according to the invention the array 22 of plane receiving mirrors produces an output light beam 23 which, as viewed in the elevation shown in FIG. 1, scans in the heightwise direction, as does also the travelling beam 30. As the output beam 23 is also parallel to the optical axis, it would (unless special countermeasures were adopted) be deflected to the focal point of lens 13, that is to say to the rocking mirror 18, this being indicated in FIG. 2 by a partially dashed line. According to the invention, and with a view to obviating a separation by means of a splitter mirror, an optical wedge 26 is positioned directly behind the lens, and deflects the output light beam 23 to a photoreceiver 24, located beside the rocking mirror 18. We are thus concerned here with an autocollimation radiation path with pupil division.

There is thus produced, at the output of the photoreceiver 24, a periodic electrical signal, which is interrupted — when obstructions penetrate the light curtain 27 — at the points concerned. It is thus possible, through the use of electronic evaluating means connected to the photoreceiver 24, to ascertain the point at which the obstruction lies in the light curtain. In simpler cases — that is to say for the purpose of preventing accidents in presses — it suffices merely to detect the presence of an obstruction, which has penetrated the light curtain 27, and, for example, to cause the press to be stopped.

Figure 3:
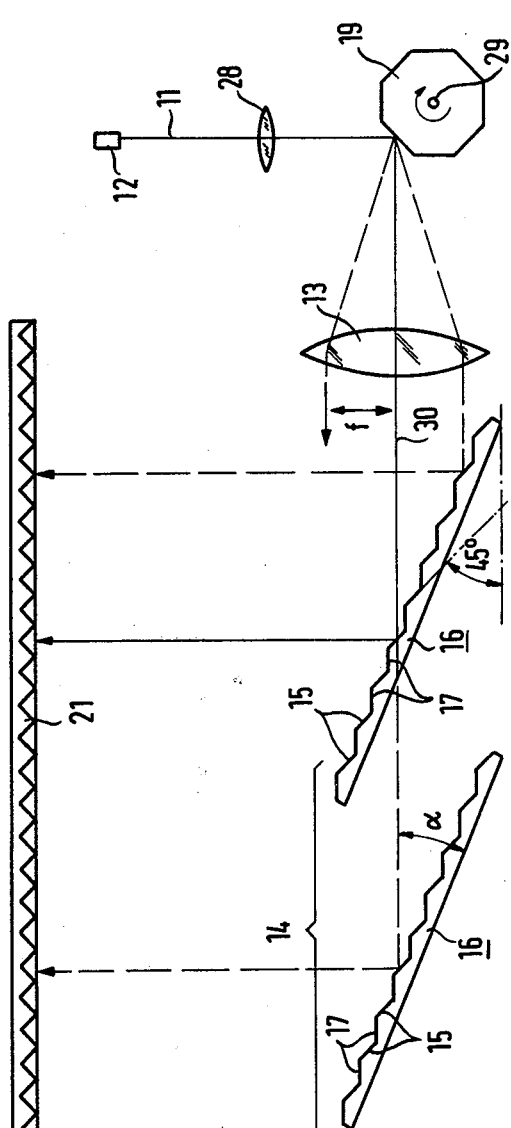
FIG. 3 is a further preferred embodiment of the apparatus for producing a wider light curtain.
Figure 4:
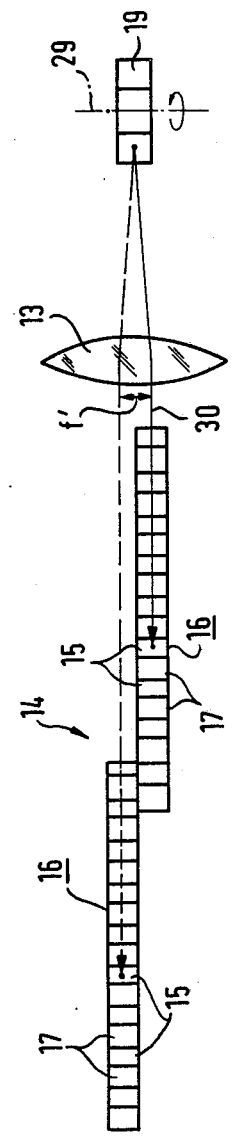
FIG. 4 is a schematic plan view of the essential elements of the apparatus shown in FIG. 3.

If the dead zones corresponding to the intermediate elements 17 should not be too great, the array 14 of plane mirrors shown in FIG. 1 must lie at a steeper angle, that is to say an angle closer to 45°. The reduction in the span or extent of the light curtain thus occasioned can, as illustrated in FIGS. 3 and 4, be prevented by arranging preferably two strips 16 (although more than two can be used), laterally offset from one another and either one lying in front of the other or with slight mutual overlap. As each of the two strips 16 receives a scanning light beam, the travelling beam 30 must not only be shifted, as shown in FIG. 3, in the heightwise direction, but also laterally, as indicated by arrow $f$ in FIG. 4. This lateral shift of the travelling beam 30 must take place whenever one of the strips 16 has been completely scanned, from the beginning to the end thereof.

As illustrated in FIGS. 3 and 4, this may for example be accomplished by arranging the reflecting surface of a mirror wheel 19 at the focal point of the lens 13, the individual mirror plane of the mirror wheel 19 being more or less tilted relative to the axis 29 of rotation of the wheel 19. In this way, for example, the mirror wheel surface shown in FIG. 4 reflects the travelling beam 30 to the first strip 16, while the following mirror surface reflects the travelling beam 30 to the second strip 16, this being indicated in FIG. 4 by the radiation path designated in dashed line. The next mirror surface then deflects the travelling beam 30 back to the first strip 16, and so forth.

In the embodiment shown in FIGS. 3 and 4, the receiving device illustrated in FIG. 2 may also be used, although the lateral displacement of the strips 16 must be sufficiently large that the second strip 16 also lies laterally beside the first array 22 of plane receiving mirrors. However, it is readily possible, in spite of the greater width, to position two arrays of plane receiving mirrors, one of which arrays lies in front of the other, and each array being laterally offset relative to the other.

Naturally, in the embodiment shown in FIGS. 3 and 4, with arrays of receiving mirrors, two optical deflecting means, in particular wedges 26, are to be provided, these wedges 26 being positioned at the points at which light, reflected by the arrays 22 of plane receiving mirrors concerned, passes into or leaves the lens 13.

By means of the embodiment illustrated in FIGS. 5 and 6, the dead zones in the light curtain 27 can be eliminated completely. In this embodiment the plane mirrors 15 constitute continuous strips 20 of plane mirrors, which strips are positioned at an angle of 45° to the optical axis, with the result that, not only are the travelling beams deflected, at an angle of 90°, to the retroreflector 21, but there will not be any interruptions in the scanning beams 30' in the light curtain 27 during the scanning operations. This is because the steps or intermediate elements 17, described in the previous embodiments, are now dispensed with. In order to achieve, in this embodiment, an extension or spread of the light curtain behind the lens 13, two or more strips 20 of plane mirrors must be arranged laterally offset relative to one another, and one strip 20 lying in front of the other; this arrangement is illustrated in FIGS. 5 and 6 by an embodiment in which three strips 20 of plane mirrors are employed. The travelling beams 30 leaving the lens 13 must for example be first deflected, by more or less tilted mirror wheel surfaces, to the first strip of plane mirrors, then to the second strip of plane mirrors and, finally, to the third strip of plane mirrors. The ray paths are shown in FIG. 6 by dashed lines.

Accordingly, in the course of rotation of the mirror wheel 19, the individual strips 20 of plane mirrors are successively scanned, there being obtained a light beam 30' which scans the light curtain 27 from one end to the other thereof.

It is also possible to use, in the embodiment shown in FIGS. 5 and 6, a light-receiving assembly similar to that used in FIG. 2, the array of plane receiving mirrors also consisting of strips of plane mirrors, which are identical to the strips 20 of plane mirrors of the array 14 of plane transmitting mirrors, apart from the width, which is preferably twice as great. Also, a timing scale 31, in the form of retroreflecting material, is preferably provided behind the lens.

It is thus possible, implementing the invention, to extend, 10- to 20-fold (or even more), a relatively narrow optical light curtain, produced with relatively uncomplicated means. A simple embodiment can be used, with only one array of plane mirrors and having relatively wide dead zones, or embodiments which use a plurality of arrays of plane mirrors, operate with small dead zones or no dead zones at all, and are not overcomplicated.

What is claimed is:

1. Optical apparatus for extending a light curtain, having a light source which emits a light beam, and a deflection device which periodically shifts the light beam parallel to itself, wherein the light beam, which is shifted parallel to itself, is directed onto an array of plane mirrors arranged at an angle to the beam, the plane mirrors being grated in echlon formation, disposed at the same angle with the direction of incident radiation and lying in the form of a strip spaced from and in front of one another, the span of said array perpendicular to the direction of the emergent beam being greater than its span perpendicular to the direction of the incident beam.

2. Apparatus according to claim 1, wherein the plane mirrors are disposed at an angle of 45° with the direction of incident radiation.

3. Apparatus according to claim 1 wherein intermediate elements of the strip, between the plane mirrors lie substantially parallel to the direction of incident radiation.

4. Apparatus according to claim 1 wherein a single said strip is provided.

5. Apparatus according to claim 4 wherein the strip lies at an angle ($\alpha$) smaller than 45° relative to the direction of incident radiation.

6. Apparatus according to claim 5, wherein the tangent of the angle ($\alpha$) is from about $\frac{1}{8}$ to about $\frac{1}{4}$.

7. Apparatus according to claim 4, wherein the tangent of the angle ($\alpha$) is about 1/5.

8. Optical apparatus for extending a light curtain, having a light source which emits a light beam, and a deflection device which periodically shifts the light beam parallel to itself, wherein the light beam, which is shifted parallel to itself, is directed onto an array of plane mirrors arranged at an angle to the beam and forming a plurality of strips disposed laterally offset from one another and following one another in the direction of incident radiation, at most fractionally overlapping one another, the deflection device not only periodically shifting the beam in the deflection plane but also perpendicular to that plane, so that the beam is successively incident on the different laterally offset steps of the strips.

9. Apparatus according to claim 8, wherein two laterally offset strips are provided.

10. Optical apparatus for extending a light curtain, having a light source which emits a light beam, and a deflection device which periodically shifts the light beam parallel to itself, wherein the light beam, which is shifted parallel to itself, is directed onto an array of plane mirrors arranged at an angle to the beam, the plane mirrors being in the form of a continuous plane on the surfaces of a plurality of strips, at least two strips being arranged laterally offset relative to one another and directly following one another in the direction of incident radiation, at most fractionally overlapping one another, the deflection device not only periodically shifting the beam in the reflection plane but also perpendicular to the reflection plane, with the result that the beam is successively incident on the different laterally offset strips.

11. Apparatus according to claim 1, wherein a retroreflector is provided at the other end of the light curtain, a second array of plane receiving mirrors lies parallel with the first array of plane transmitting mirrors, and the output beam of the second array is passed to a photoreceiver.

12. Apparatus according to claim 11, wherein the second array of plane receiving mirrors is optically identical to the first array of plane transmitting mirrors.

13. Apparatus according to claim 11, wherein the second array of plane receiving mirrors is wider than the first array of plane transmitting mirrors.

14. Apparatus according to claim 11, wherein the second array of plane receiving mirrors and the first array of plane transmitting mirrors lie on one and the same strip.

15. Apparatus according to claim 11, wherein an optical separating wall extends parallel to the reflection plane and lies between the second array of plane receiving mirrors and the first array of plane transmitting mirrors.

16. Apparatus according to claim 11, wherein the output beam of the second array of plane receiving mirrors is deflected away from the incident beam, by optical guiding means to the photoreceiver.

17. Apparatus according to claim 1, wherein said deflection device comprises at least one rotatable mirror which lies, in the position in which it reflects the light beam, in the focal point of a lens transmitting the beam.

18. Apparatus according to claim 1, wherein said optical deflecting means is a wedge positioned in front of or behind said lens.

19. Apparatus according to claim 10, wherein for the purpose of obtaining a light curtain for measurement purposes, a timing scale is provided, which receives part of the stream of radiation and is made of retroreflective material.

20. Apparatus according to claim 19, wherein the timing scale consists of individual parts, each of which is associated with a said strip, and receives a small part of the transmitted light, most of which arrives at that strip.

21. Apparatus according to claim 20, wherein the timing scale has, associated with it, its own radiation-receiving photo-cell.

* * * * *